(12) United States Patent
Dimitroff

(10) Patent No.: US 6,212,606 B1
(45) Date of Patent: Apr. 3, 2001

(54) COMPUTER SYSTEM AND METHOD FOR ESTABLISHING A STANDARDIZED SHARED LEVEL FOR EACH STORAGE UNIT

(75) Inventor: John E. Dimitroff, Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/170,965

(22) Filed: Oct. 13, 1998

(51) Int. Cl.⁷ .................................................. G06F 12/00
(52) U.S. Cl. ........................ 711/147; 711/148; 711/151; 711/152
(58) Field of Search ................................... 711/147, 148, 711/151, 152

(56) References Cited

U.S. PATENT DOCUMENTS 5,586,258 * 12/1996 Conterno et al. ................... 711/122

OTHER PUBLICATIONS

"Virtual Interface Architecture for SANs", Compaq Technology Brief, First Edition, May 1997, pp. 1–12.
"Making Enterprise–Class Clusters Come Alive", Tandem Computers Incorporated, Apr. 1997, pp. 1–21.
Robert W. Horst, David Garcia, "ServerNet SAN I/O Architecture," Tandem Computers Incorporated, Hot Interconnects V, 1997, pp. 1–8.
"Fibre Channel Overview," www.fibrechannel.com, May 5, 1998, pp. 1–13.

* cited by examiner

Primary Examiner—Reginald G. Bragdon
(74) Attorney, Agent, or Firm—Fletcher, Yoder & Van Someren

(57) ABSTRACT

A computer system and method using a standardized shareability scheme for establishing a shared level for each of a plurality of storage units located in the computer system. The computer system includes a plurality of hosts and controllers coupled to a peer network (storage area network). Each storage unit is coupled to one of the controllers and includes at least one parametric from a group of parametrics used in classifying the shared level of a particular storage unit. The hosts using the standardized shared levels are able to identify a shareability characteristic of each storage unit.

46 Claims, 2 Drawing Sheets

COMPUTER SYSTEM AND METHOD FOR ESTABLISHING A STANDARDIZED SHARED LEVEL FOR EACH STORAGE UNIT

BACKGROUND OF THE INVENTION

1. Technical Field of the Invention

The present invention relates to the computer field and, in particular, to a computer system and method for establishing and standardizing a shared level for each storage unit located in a multi-server environment.

2. Description of Related Art

A current computer system incorporating multiple servers capable of sharing at least one storage unit has a time consuming task of identifying the specific capabilities of a particular storage unit prior to utilizing that storage unit. The specific capabilities of any storage unit often include functionalities related to access, availability, ownership, management and security (optional). Of course, the current computer system uses valuable resources in determining the different capabilities of every storage unit located within the computer system.

Accordingly, there is a need for a computer system and method for establishing a standardized shared level for each storage unit located in a multi-server environment, where each shared level is indicative of the specific capabilities (e.g., parametrics) of a corresponding storage unit. In other words, there is a need for a computer system and method having a scheme for standardizing and unifying the description of the various capabilities of different storage units using standardized shared levels based on parametrics. This and other needs are satisfied by the computer system and method of the present invention.

SUMMARY OF THE INVENTION

The present invention is a computer system and method using a standardized shareability scheme for establishing a shared level for each of a plurality of storage units located in the computer system. The computer system includes a plurality of hosts and controllers coupled to a peer network (storage area network). Each storage unit is coupled to one of the controllers and includes at least one parametric from a group of parametrics used in classifying the shared level of a particular storage unit. The hosts using the standardized shared levels are able to identify a shareability characteristic of each storage unit.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
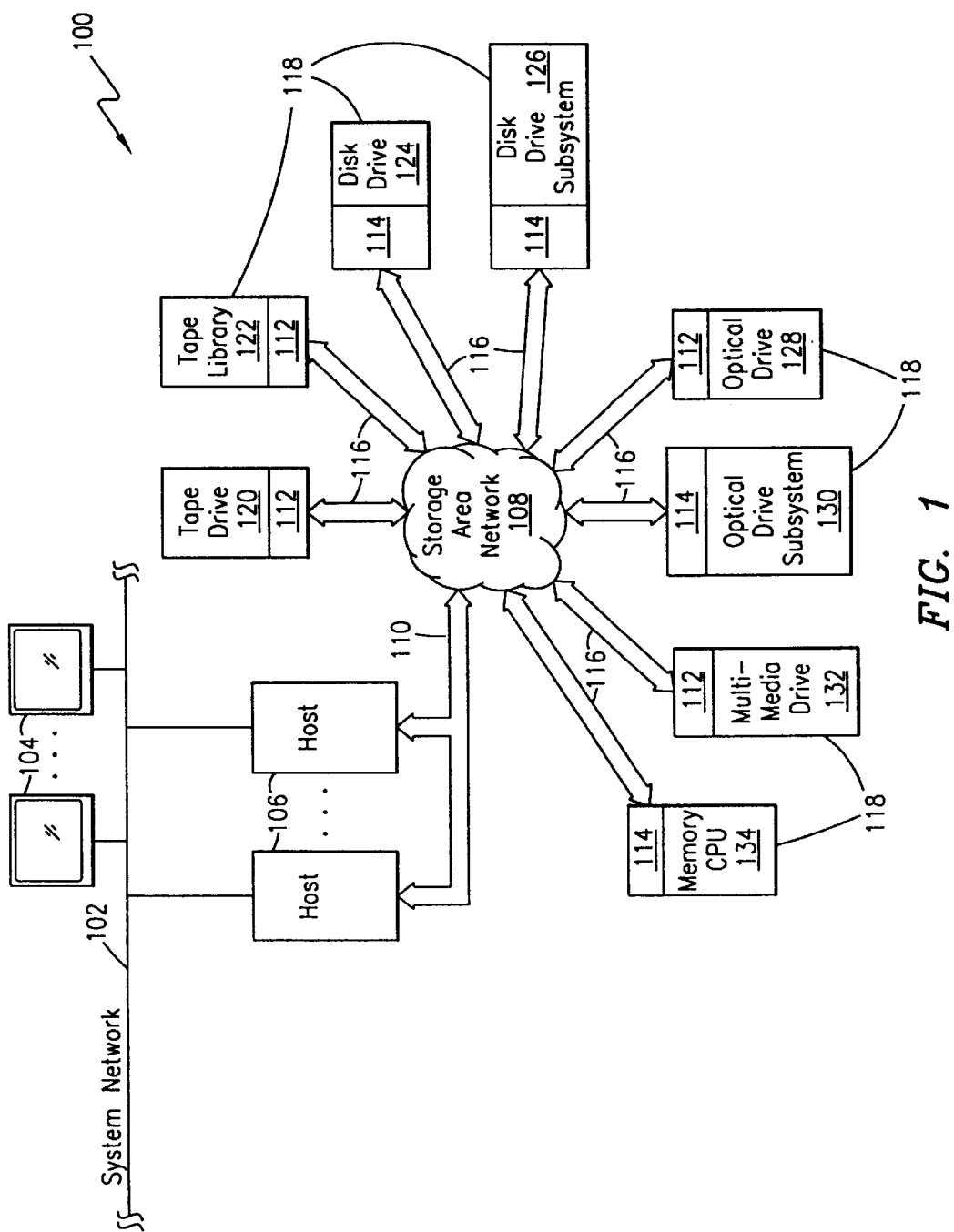
FIG. 1 is a block diagram of a computer system in accordance with the present invention.
Figure 2:
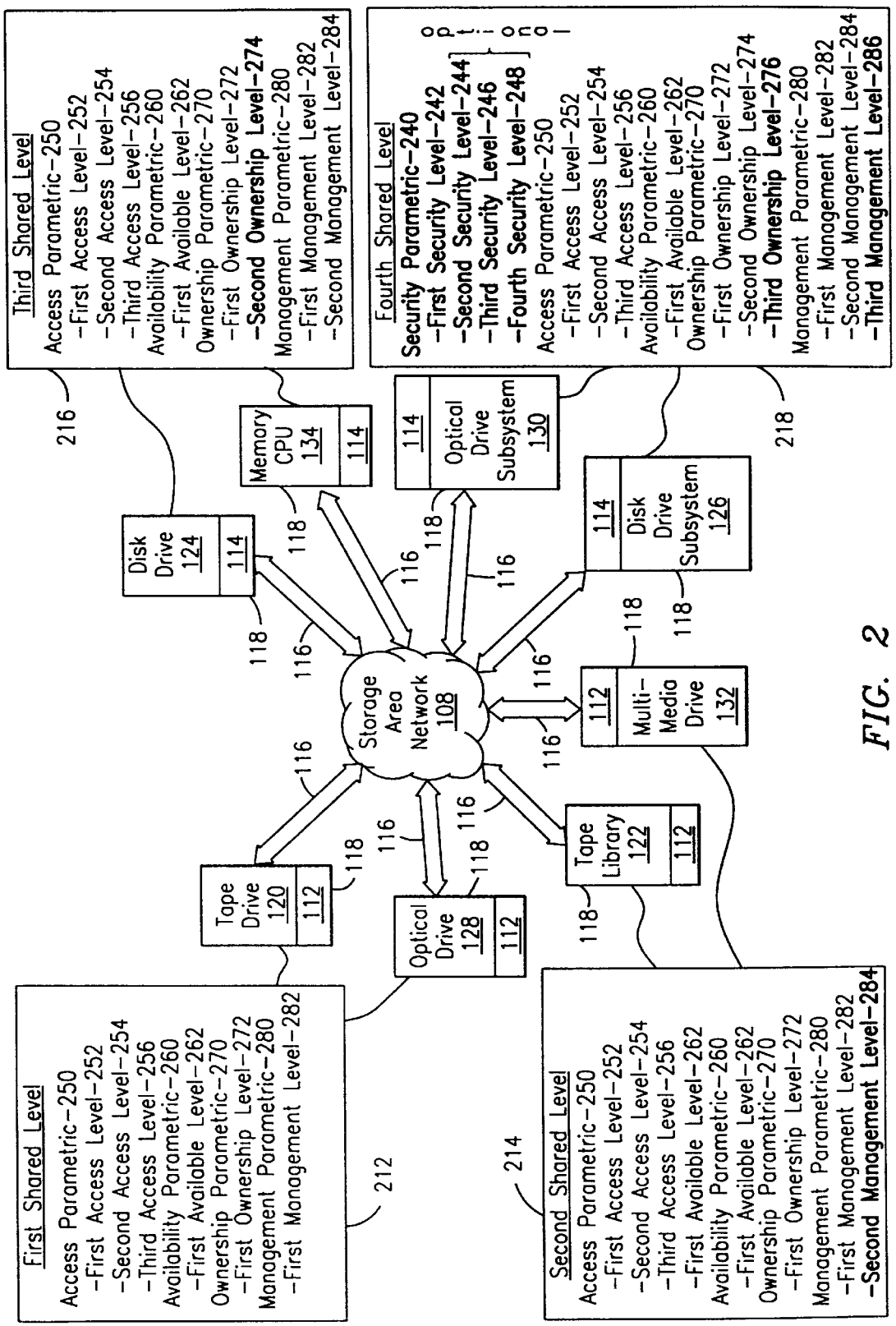
FIG. 2 is a block diagram illustrating the exemplary standardized shared levels and various parametrics that can be associated with the storage units shown in FIG. 1.

Referring to the Drawings, wherein like numerals represent like parts throughout FIGS. 1–2, there is disclosed an embodiment of an exemplary computer system 100 and method in accordance with the present invention.

In order to better describe the present invention a detailed description about the standardized shared levels and various parametrics of the storage units within the computer system 100 is deferred pending a discussion about the general architecture of the computer system.

Referring to FIG. 1, there is illustrated a block diagram of the computer system 100 in accordance with the present invention. For clarity, certain details associated with the computer system 100 are well known in the industry and as such are not described herein. Therefore, the description provided below in relation to the computer system 100 and the method describes only the components necessary to understand the present invention.

The computer system 100 is preferably configured using a system network 102 such as a Local Area Network (LAN), a System Area Network (SAN) or a Wide Area Network (WAN). The system network 102 can be a high-speed communication system designed to link several workstations 104 and hosts 106 (e.g., servers/initiators) together so as to share computing resources including hardware, application programs and information.

The hosts 106 connect to a storage area network 108 (e.g., peer network/storage topology) using line 110, where the storage area network is transport independent. For example, the storage area network 108 of the presently described computer system is preferably based on the Fibre Channel standard which is incorporated to the fullest extent possible into this specification.

The storage area network 108 also connects to at least one controller 112 or at least one intelligent controller 114 using lines 116, where the differences between the types of controllers are discussed later. Each controller 112 or intelligent controller 114 is coupled with or incorporated into a corresponding storage unit 118 that operates to store data including files and images. In addition, each controller 112 and intelligent controller 114 may be capable of writing, reading and reformatting data from and to any of the hosts 106 or respective storage units 118.

Of course, there may be more than one type of storage unit 118 located within the computer system 100 which may include for example, a tape drive 120, tape library 122, disk drive 124, disk drive subsystem 126, optical drive 128, optical drive subsystem 130, multi-media drive 132 and memory within a central processing unit 134. As mentioned earlier, the standardized shared levels and various parametrics of the different storage units 118 are discussed with reference to FIG. 2.

Referring to FIG. 2, there is a block diagram illustrating the standardized shared levels 212, 214, 216, and 218 used to classify the various parametrics associated with the storage units 118 shown is FIG. 1. As described earlier, one aspect of the present invention includes classifying the different capabilities of storage units 118 by establishing different standardized shared levels (e.g., first shared level 212, second shared level 214, third shared level 216 and fourth shared level 218) based on the specific parametrics or physical properties of the particular storage unit 118. It should be understood that the different types (e.g.,optical drive 128 and tape drive 120) of storage units 118 can still have the same parametrics or shared levels 212, 214, 216, or 218.

The parametrics can be classified into a security parametric 240, an access parametric 250, an availability parametric 260, an ownership parametric 270 and a management parametric 280. In addition, each parametric 240, 250, 260 and 270 can be further divided into multiple levels that are described later with respect to the different standardized shared levels 212, 214, 216 and 218. Again, the various parametrics 240, 250, 260, and 270 are used to classify and identify the physical properties and capabilities of each storage unit 118.

In addition, use of the various parametrics 240, 250, 260 and 270 enables the hosts 106 or user to measure the "sharedness" of any one of the storage units 118, and to identify the storage units capable of evolving into a smart device. The smart device has the capability to change or modify any of the parametrics 240, 250, 260 and 270 associated with itself.

Referring to the first shared level 212, the storage units 118 (e.g., tape drive 120 and optical drive 128) identified by the first shared level 212 include the access parametric 250, the availability parametric 260, the ownership parametric 270 and the management parametric 280. The lack of the security parametric 240 indicates that any one of the hosts 106 can have ownership of the storage unit 118. Below is a detailed description of each parametric 250, 260, 270 and 280 associated with the first shared level 212.

The presence of the access parametric 250 preferably indicates that a particular communication protocol has enabled the respective controller 112 or 114 with the ability to read or write data from and to the corresponding storage unit 118. More particularly, the access parametric 250 includes a first access level 252 for enabling the hosts 106 to determine a presence of the storage unit 118, a second access level 254 for informing the hosts that the storage unit can communicate in the first place, and a third access level 256 for enabling the hosts to identify the storage unit.

The presence of the availability parametric 260 generally indicates the conditions under which the storage unit 118 and particular controller 112 and 114 are available to be accessed. More particularly, the availability parametric 260 includes a first availability level 262 that permits the hosts 106 to communicate with the storage unit 118. Of course, the storage unit 118 requires at least the levels of the access parametric 250 and the availability parametric 260 to be functional.

The presence of the ownership parametric 270 typically indicates that one of the hosts 106 can be associated with a particular storage unit 118 and controller 112 or 114. More specifically, the ownership parametric 270 includes a first ownership level 272 that requires the storage unit 118 to respond with a busy signal to all other hosts while communicating with one of the hosts 106. The first ownership level 272 may also be referred to as "Command Ownership". The storage unit 118 can be available but functionally inaccessible due to the status of the first ownership level 272.

The presence of the management parametric 280 is indicative of the specific ability to set, inquire and/or change configurations of the controller 112 or 114 attached to the storage unit 118. More particularly, the management parametric 280 includes a first management level 282 for enabling the hosts 106 to identify the storage unit 118 and receive information about the state of the storage unit.

Therefore, any storage unit 118 (e.g., tape drive 120 and optical drive 128) assigned the first shared level 212 includes the parametrics of the three access levels 252, 254, and 256 from the access parametric 250, one availability level 262 from the availability parametric 262, one ownership level 272 from the ownership parametric 270 and one management level 282 from the management parametric 280.

Moreover, a minimum command set used by the storage units 118 assigned the first shared level 212 include a readiness command, positioning command, write command and a read command. It should be understood, that disks (e.g., disk drives 124 and disk sub-systems 126) have the positioning command within the write and read commands, and storage units 118 that are sequential have separate positioning commands.

Referring to the second shared level 214, the storage units 118 (e.g., tape library 122 and multi-media drive 132) identified by the second shared level 214 include the parametrics 250, 260, 270 and 280 and associated levels of the first shared level 212 in addition to a second management level 284. The second management level 284 enables the hosts 106 to modify the internal parameters of the storage unit 118. The internal parameters include blocking size, mode pages, log pages, vendor unique inquiry data, error conditions and status conditions.

Therefore, any storage unit 118 (e.g., the tape drive 122 and multi-media drive 132) assigned the second shared level 214 includes the parametrics of the three access levels 252, 254, and 256 from the access parametric 250, one availability level 262 from the availability parametric 262, one ownership level 272 from the ownership parametric 270 and two management levels 282 and 284 from the management parametric 280.

Referring to the third shared level 216, the storage units 118 (e.g., disk drive 124 and memory in the CPU 134) identified by the third shared level 216, include the parametrics 250, 260, 270 and 280 and associated levels of the second shared level 214 in addition to a second ownership level 274. The second ownership level 274 permits the reservation and release of the storage unit 118 by the hosts 106.

Therefore, any storage unit 118 (e.g., disk drive 124 and memory in the CPU 134) assigned the third shared level 216 includes the parametrics of the three access levels 252, 254, and 256 from the access parametric 250, one availability level 262 from the availability parametric 262, two ownership levels 272 and 274 from the ownership parametric 270 and two management levels 282 and 284 from the management parametric 280.

Referring to the fourth shared level 218, the storage units 118 (e.g., disk drive subsystem 126 and optical drive subsystem 130) assigned the fourth shared level 218 include the parametrics 250, 260, 270, and 280 and associated levels of the third shared level 216 in addition to a first security level 242 of a security parametric 240, and a third ownership level 276 and a third management level 286.

The first security level 242 operates to allow a limited number of the hosts 106 to use the respective storage unit 118. The first security level 242 is effectively triggered by the presence of the third management level 286 that identifies a predetermined number of hosts 106 capable of using the storage unit 118, and the third ownership level 276 that enables the predetermined number of hosts to utilize the storage unit.

Therefore, any storage unit 118 (e.g., disk drive subsystem 126 and optical drive subsystem 130) assigned the fourth shared level 218 includes the parametrics of one security level 242 from the security parametric 240, three access levels 252, 254, and 256 from the access parametric 250, one availability level 262 from the availability parametric 262, three ownership levels 272, 274 and 276 from the ownership parametric 270 and three management levels 282, 284 and 286 from the management parametric 280. Again, the hosts 106 or user are able to identify a shareability characteristic of a particular storage unit 118 by referring to the corresponding standardized shared level 212, 214, 216 or 218.

Also, the fourth shared level 218 may not be limited to the first security level 242 in that the storage unit 118 may also include selected ones of a second security level 244, a third security level 246 and a fourth security level 248. The second security level 244 requires the hosts 106 to use a password before gaining access to the storage unit. The third security level 246 requires the hosts to use either an encrypted password or an encrypted data password before gaining access to the storage unit 118 and before gaining access to data located on the storage unit, respectively. The fourth security level 248 requires the hosts 106 to use both the encrypted password and the encrypted data password.

The storage units 118 identified by the third shared level 216 or the fourth shared level 218 generally use intelligent controllers 114 instead of the controllers 112, but are not required to use the intelligent controllers. The intelligent controllers 114 use a protocol (e.g., in-band communication) to communicate with the attached storage unit 118. In addition to the capabilities of the controllers 112, the intelligent controllers 114 include time availability, capacity availability and performance availability capabilities. The intelligent controller 114 having the time availability capability can operate a predetermined number of hours per session, and for a specific number or on a specific hour(s), day(s), month(s), or year(s). The capacity availability capability enables the intelligent controller 114 to determine the amount of media currently available in the storage unit 118. And, the intelligent controller 114 having the performance availability capability is able to dynamically control the data transfer rate or data stream control such that other hosts 106 contending for access to the storage unit 118 are not starved.

The following is an exemplary equation that may be used for determining the shared value of a storage unit:

$$S_{su} = (S+Sc)*AC*AU*(1+(O+M)) \tag{1}$$

where $S_{su}$=shared level of a storage unit;
S=Security
Sc=command security (Sc≠O);
AC=access level;
AV=availability level;
O=ownership level; and
M=management level.

From the foregoing, it can be readily appreciated by those skilled in the art that the present invention provides a computer system and method for establishing and standardizing a shared level for each storage unit located in a multi-server environment. Also, the computer system as disclosed enables the hosts or user to identify a shareability characteristic of each storage unit using standardized shared levels.

Although one embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit as set forth and defined by the following claims.

What is claimed is:

1. A computer system comprising:
 a storage area network;
 a plurality of hosts coupled to the storage area network; and
 a plurality of storage units coupled to the storage area network, each storage unit classified by a standardized shared level from a plurality of standardized shared levels, each standardized shared level comprising at least one parametric from a plurality of distinct parametrics, the plurality of distinct parametrics being associated with functionalities of the plurality of storage units, wherein the respective standardized shared level assigned to each storage unit enables the hosts to identify a standardized shareability characteristic of each storage unit.

2. The computer system in accordance with claim 1, comprising at least one controller located between the storage area network and at least one of the storage units.

3. The computer system in accordance with claim 2, wherein the at least one controller comprises an intelligent controller.

4. The computer system in accordance with claim 1, wherein the storage area network comprises one of a peer network and a storage topology.

5. The computer system in accordance with claim 1, wherein at least one of the plurality of hosts comprises one of a server and an initiator.

6. The computer system in accordance with claim 1, wherein at least one of the plurality of storage units comprises one of a tape drive, a tape library, a disk drive, a disk drive subsystem, an optical drive, an optical drive subsystem, a multi-media drive, and memory.

7. The computer system in accordance with claim 1, wherein the plurality of distinct parametrics comprises a security parametric, an access parametric, an availability parametric, an ownership parametric, and a management parametric.

8. The computer system in accordance with claim 7, wherein the plurality of standardized shared levels comprises a first shared level including three access levels of the access parametric, one availability level of the availability parametric, one ownership level of the ownership parametric and one management level of the management parametric.

9. The computer system in accordance with claim 8, wherein a particular storage unit assigned the first shared level includes a command set comprising a readiness command, a positioning command, a write command, and a read command.

10. The computer system in accordance with claim 7, wherein the plurality of standardized shared levels comprises a second shared level including three access levels of the access parametric, one availability level of the availability parametric, one ownership level of the ownership parametric, and two management levels of the management parametric.

11. The computer system in accordance with claim 7, wherein the plurality of standardized shared levels comprises a third shared level including three access levels of the access parametric, one availability level of the availability parametric, two ownership levels of the ownership parametric, and two management levels of the management parametric.

12. The computer system in accordance with claim 7, wherein the plurality of standardized shared levels comprises a fourth shared level including three access levels of the access parametric, one availability level of the availability parametric, three ownership levels of the ownership parametric, three management levels of the management parametric, and one security level of the security parametric.

13. The computer system in accordance with claim 12, wherein the fourth shared level comprises at least one of a second security level, a third security level, and a fourth security level.

14. A computer system comprising:
   a peer network;
   a plurality of hosts coupled to the peer network;
   a plurality of controllers coupled to the peer network; and
   a plurality of storage units coupled to the peer network, each storage unit classified by a standardized shared level from a plurality of standardized shared levels, each standardized shared level comprising at least one parametric from a plurality of distinct parametrics, the plurality of distinct parametrics being associated with functionalities of the plurality of storage units, wherein the respective standardized shared level assigned to each storage unit enables the hosts to identify a standardized shareability characteristic of each storage unit.

15. The computer system in accordance with claim 14, wherein the plurality of distinct parametrics comprises a security parametric, an access parametric, an availability parametric, an ownership parametric, and a management parametric.

16. The computer system in accordance with claim 15, wherein the security parametric comprises at least one security level from the following:
   a first security level for allowing a limited number of the hosts to use a particular storage unit;
   a second security level for requiring the hosts to use a password before gaining access to a particular storage unit;
   a third security level for requiring the hosts to use one of an encrypted password and an encrypted data password before gaining access to a particular storage unit and before gaining access to data located on the particular storage unit, respectively; and
   a fourth security level requiring the hosts to use both the encrypted password and the encrypted data password.

17. The computer system in accordance with claim 15, wherein the access parametric comprises at least one access level from the following:
   a first access level for enabling the hosts to determine a presence of a particular storage unit;
   a second access level for informing the hosts that a particular storage unit is able to communicate; and
   a third access level for enabling the hosts to identify a particular storage unit.

18. The computer system in accordance with claim 15, wherein the availability parametric comprises
   a first availability level for permitting the hosts to communicate with a particular storage unit.

19. The computer system in accordance with claim 15, wherein the ownership parametric comprises at least one ownership level from the following:
   a first ownership level for requiring a particular storage unit communicating with one of the hosts to respond with a busy signal to all other hosts;
   a second ownership level for permitting the reservation and release of a particular storage unit by the hosts; and
   a third ownership level for enabling only a predetermined number of the hosts to utilize a particular storage unit.

20. The computer system in accordance with claim 15, wherein the management parametric comprises at least one management level from the following:
   a first management level for enabling the hosts to identify a particular storage unit and receive information about a state of the particular storage unit;
   a second management level for enabling the hosts to modify internal parameters of a particular storage unit; and
   a third management level for identifying a predetermined number of the hosts that can utilize a particular storage unit.

21. A method for establishing a standardized shared level for a storage unit located in a computer system, said computer system includes a storage area network located between the storage unit and a plurality of hosts, said method comprising the steps of:
   assigning at least one parametric from a plurality of distinct parametrics to the storage unit;
   determining, in response to the at least one assigned parametric, the standardized shared level for the storage unit; and
   enabling the hosts to identify a shareability characteristic of the storage unit using the determined standardized shared level.

22. The method in accordance with claim 21, wherein the step of assigning further includes classifying the plurality of distinct parametrics into a security parametric, an access parametric, an availability parametric, an ownership parametric and a management parametric.

23. The method in accordance with claim 22, wherein said step of classifying further includes dividing the security parametric into at least one of the following security levels:
- a first security level for allowing a limited number of the hosts to use the storage unit;
- a second security level for requiring the hosts to use a password before gaining access to the storage unit;
- a third security level for requiring the hosts to use a selected one of an encrypted password and an encrypted data password before gaining access to the storage unit and before gaining access to data located on the storage unit, respectively; and
- a fourth security level requiring the hosts to use both the encrypted password and the encrypted data password.

24. The method in accordance with claim 22, wherein the step of classifying further includes dividing the access parametric into at least one of the following access levels:
- a first access level for enabling the hosts to determine a presence of the storage unit;
- a second access level for informing the hosts that the storage unit is able to communicate; and
- a third access level for enabling the hosts to identify the storage unit.

25. The method in accordance with claim 22, wherein the step of classifying further includes dividing the availability parametric into at least one availability level including a first availability level for permitting the hosts to communicate with the storage unit.

26. The method in accordance with claim 22, wherein the step of classifying further includes dividing the ownership parametric into at least one of the following ownership levels:
- a first ownership level for requiring the storage unit communicating with one of the hosts to respond with a busy signal to all other hosts;
- a second ownership level for permitting the reservation and release of the storage unit by the hosts; and
- a third ownership level for enabling only a predetermined number of the hosts to utilize the storage unit.

27. The method in accordance with claim 22, wherein the step of classifying further includes dividing the management parametric into at least one of the following management levels:
- a first management level for enabling the hosts to identify the storage unit and receive information about a state of the storage unit;
- a second management level for enabling the hosts to modify internal parameters of the storage unit; and
- a third management level for identifying a predetermined number of the hosts that can utilize the storage unit.

28. A storage unit used in a computer system including a storage area network for connecting the storage unit to a plurality of hosts, the storage unit comprising:
- at least one parametric from a plurality of distinct parametrics comprising
  - a security parametric, an access parametric, an availability parametric, an ownership parametric, and a management parametric; and
- a plurality of standardized shared levels, each standardized shared level corresponds with the at least one parametric and enables the hosts to identify a standardized shareability characteristic of the storage unit.

29. The storage unit in accordance with claim 28, wherein said plurality of standardized shared levels further comprising a first shared level including three access levels of said access parametric, one availability level of said availability parametric, one ownership level of said ownership parametric and one management level of said management parametric.

30. The storage unit in accordance with claim 28, wherein said plurality of standardized shared levels further comprising a second shared level including three access levels of said access parametric, one availability level of said availability parametric, one ownership level of said ownership parametric and two management levels of said management parametric.

31. The storage unit in accordance with claim 28, wherein said plurality of standardized shared levels further comprising a third shared level including three access levels of said access parametric, one availability level of said availability parametric, two ownership levels of said ownership parametric and two management levels of said management parametric.

32. The storage unit in accordance with claim 28, wherein said plurality of standardized shared levels further comprising a fourth shared level including three access levels of said access parametric, one availability level of said availability parametric, three ownership levels of said ownership parametric, three management levels of said management parametric and one security level of said security parametric.

33. The storage unit in accordance with claim 32, wherein said fourth shared level further includes at least one of a second security level, a third security level and a fourth security level.

34. The storage unit in accordance with claim 28, wherein said security parametric further includes at least one security level from the following:
- a first security level for allowing a limited number of the hosts to use the storage unit;
- a second security level for requiring the hosts to use a password before gaining access to the storage unit;
- a third security level for requiring the hosts to use a selected one of an encrypted password and an encrypted data password before gaining access to the storage unit and before gaining access to data located on the storage unit, respectively; and
- a fourth security level requiring the hosts to use both the encrypted password and the encrypted data password.

35. The storage unit in accordance with claim 28, wherein said access parametric further includes at least one access level from the following:
- a first access level for enabling the hosts to determine a presence of the storage unit;
- a second access level for informing the hosts that the storage unit is able to communicate; and
- a third access level for enabling the hosts to identify the storage unit.

36. The storage unit in accordance with claim 28, wherein said availability parametric further includes at least one availability level including a first availability level for permitting the hosts to communicate with the storage unit.

37. The storage unit in accordance with claim 28, wherein said ownership parametric further includes at least one ownership level from the following:

a first ownership level for requiring the storage unit communicating with one of the hosts to respond with a busy signal to all other hosts;

a second ownership level for permitting the reservation and release of the storage unit by the hosts; and a third ownership level for enabling only a predetermined number of the hosts to utilize the storage unit.

38. The storage unit in accordance with claim 28, wherein said management parametric further includes at least one management level from the following:

a first management level for enabling the hosts to identify the storage unit and receive information about a state of the storage unit;

a second management level for enabling the hosts to modify internal parameters of the storage unit; and a third management level for identifying a predetermined number of the hosts that can utilize the storage unit.

39. A storage unit, comprising:

at least a first parametric from a plurality of parametrics, the plurality of parametrics comprising an access parametric, an availability parametric, an ownership parametric, and a management parametric; and a first standardized shared level from a plurality of standardized shared levels, wherein each of the standardized shared levels is defined by at least one parametric from the plurality of parametrics, wherein the first standardized shared level is determined based on the at least first parametric, and wherein the first standardized shared level enables a host to identify a standardized shareability characteristic of the storage unit when the storage unit is coupled to the host via a network.

40. The storage unit as recited in claim 39, wherein the plurality of parametrics comprises a security parametric.

41. The storage unit as recited in claim 40, wherein the security parametric comprises a plurality of security levels, each security level identifying a level of security required for the host to use the storage unit.

42. The storage unit as recited in claim 41, wherein a first level of security comprises an encrypted password to be used by the host.

43. The storage unit as recited in claim 39, wherein the access parametric comprises a plurality of access levels, each access level indicative of a particular level of access to the storage unit by the host.

44. The storage unit as recited in claim 39, wherein the availability parametric comprises a plurality of availability levels, each availability level indicative of a condition under which the storage unit is available for access by the host.

45. The storage unit as recited in claim 39, wherein the ownership parametric comprises a plurality of ownership levels, each ownership level indicative of a type of ownership of the storage unit by the host.

46. The storage unit as recited in claim 39, wherein the management parametric comprises a plurality of management levels, each management level indicative of a level of management of the storage unit by the host.

* * * * *